United States Patent
Hamamatsu et al.

(10) Patent No.: US 6,996,184 B2
(45) Date of Patent: Feb. 7, 2006

(54) IMAGE-DATA PROCESSING APPARATUS

(75) Inventors: Toshihiko Hamamatsu, Saitama (JP); Tetsujiro Kondo, Tokyo (JP); Hideo Nakaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 496 days.

(21) Appl. No.: 09/775,179

(22) Filed: Feb. 1, 2001

(65) Prior Publication Data

US 2001/0033618 A1    Oct. 25, 2001

(30) Foreign Application Priority Data

Feb. 2, 2000    (JP)    ............................. 2000-025000

(51) Int. Cl.
*H04N 7/28* (2006.01)
(52) U.S. Cl. ............................. 375/240.25; 375/240.27
(58) Field of Classification Search ............................. 375/240.25–240.29, 240.1–240.18
See application file for complete search history.

(56) References Cited

U.S. PATENT DOCUMENTS 6,178,205 B1 * 1/2001 Cheung et al. ........ 375/240.29

FOREIGN PATENT DOCUMENTS

JP    07-212759    8/1995

* cited by examiner

*Primary Examiner*—Andy Rao
(74) *Attorney, Agent, or Firm*—Frommer Lawrence & Haug LLP; William S. Frommer; Thomas F. Presson

(57) ABSTRACT

An image processing apparatus detects a noise area in image data generated by decoding encoded data encoded by a frequency transform method and a lossy compression method. The image processing apparatus includes a motion detection unit for detecting motion in an area having at least one pixel in the image data, a deviation detection unit for detecting the deviation of the image motion in the area having at least one pixel, and a noise detection unit for detecting the noise area in accordance with the deviation of the image motion.

30 Claims, 11 Drawing Sheets

IMAGE-DATA PROCESSING APPARATUS

BACKGROUND OF THE INVENTION

1. Field of the Invention

The present invention relates to an image-data processing apparatus which detects a part in which noise occurs in decoded image data obtained by decoding image data which is created by performing frequency transformation and lossy compression, for example, using an MPEG (Moving Picture Expert Group) method.

2. Description of the Related Art

When image data is read or transmitted via a transmission line, the image data is data-compression coded to save storage capacity or transmission line capacity. The compression-coded image data is data-decompression decoded to be restored to the original image data when it is read or received at the receiving end.

When image data is compression coded, redundant information included in the image data is removed based on statistical characteristics of the image data, whereby a reduction in the amount of data is achieved. Generally, since human vision exhibits low-pass filtering characteristics, the high frequency components of the image are roughly quantized, so that high compression-coding efficiency is obtained.

As this type of the highly efficient compression-coding method, an MPEG method is often used in which data-compression coding is performed by executing a discrete cosine transform and then restricting the high frequency components. Since data compression is performed using the frequency transformation and lossy compression in which the high frequency components are restricted, noise occurs, so-called "mosquito noise", which is a change in the level of the luminance component and the chrominance component that are in the proximity of a high-contrast edge or a moving object. The mosquito noise degrades the quality of the restored image.

FIGS. 9A and 9B show mosquito noise of a character "A" which is displayed at the same position of a screen. In FIG. 9A, no noise occurs in the original image of the character "A" before MPEG compression. When the image is MPEG compressed and then decompression-decoded, mosquito noise N occurs due to slight level variations in the periphery of the character "A", that is, a high contrast edge part, as shown in FIG. 9B.

When a moving image of a rotating gear shown in FIG. 10A is MPEG compression-coded and decompression-decoded, the mosquito noise N occurs due to slight level variations in the periphery of the rotating gear. In FIG. 10B, since the gear rotates, the part having the mosquito noise moves along with the edges of the gear.

Methods have been proposed for reducing the mosquito noise occurring due to decoding of the compressed image data. For example, in Japanese Unexamined Patent Application Publication No. 7-212759, a method for reducing the mosquito noise in the image signal is disclosed as follows. That is, since the mosquito noise occurs at the high contrast edge, an edge-part extracting unit 1, as shown in FIG. 11, extracts an edge part of an input image signal $S_v$ and then a noise-reduction filter 2 filters the extracted edge part of the image signal that is output from the edge-part extracting unit 1, whereby an image signal having reduced mosquito noise is obtained.

In this conventional method shown in FIG. 11, filtering processing for rejecting the mosquito noise is performed at the edge part of an image signal regardless of the presence or absence of the mosquito noise. Therefore, the quality of the image is degraded where no mosquito noise occurs. Furthermore, when, instead of an image signal which is decompression-decoded from highly efficiently compression-coded image data, a high quality image signal $S_v$ having no mosquito noise is input, the operation of the noise-reduction filter 2 at the edge part of the image signal $S_v$ rather degrades the image quality thereof.

Accordingly, as shown in FIG. 12, the edge-part extracting unit 1 and the noise-reduction filter 2 are provided so that an MPEG decoding unit 3 outputs an output signal $S_m$ only thereto. In addition, a switching circuit 4 is provided so that an input image $S_s$ which is not processed by the MPEG decoding unit 3 bypasses the noise-reduction filter 2 and avoids undergoing the edge-part filtering performed by the noise-reduction filter 2. A user may operate this switching circuit 4.

However, when the MPEG decoded image data is input as the image signal $S_s$, since the input decoded image data is not processed for reducing the mosquito noise by the noise-reduction filter 2, a degraded image is obtained.

The foregoing problem arises because, without detecting a part having the noise such as the mosquito noise, the edge part of the decoded image signal obtained by decoding the image data that undergoes frequency transformation and lossy compression is assumed to be a part having the noise and then noise reduction processing is performed on the edge part.

SUMMARY OF THE INVENTION

Accordingly, it is an object of the present invention to solve the foregoing problem so that the invention can detect a part having noise such as mosquito noise included in decoded image data obtained by decoding image data that undergoes frequency transformation and lossy compression.

To this end, according to a first aspect of the present invention, there is provided an image processing apparatus for detecting a noise area in image data generated by decoding encoded data encoded by a frequency transform method and a lossy compression method. The image processing apparatus includes a motion detection unit for detecting motion in an area having at least one pixel in the image data, a deviation detection unit for detecting the deviation of the image motion in the area having at least one pixel, and a noise detection unit for detecting the noise area in accordance with the deviation of the image motion.

According to a second aspect of the present invention, an image processing method detects a noise area in image data generated by decoding encoded data encoded by a frequency transform method and a lossy compression method. The image processing method includes the steps of detecting motion in an area having at least one pixel in the image data, detecting deviation of the image motion in the area having at least one pixel, and detecting the noise area in accordance with the deviation of the image motion.

According to a third aspect of the present invention, a storage medium stores a computer-controllable program for detecting a noise area in image data generated by decoding encoded data encoded by a frequency transform method and a lossy compression method. The computer program comprising the steps of detecting motion on an area having at least one pixel in the image data, detecting the deviation of image motion on the area having at least one pixel, and detecting the noise area in accordance with the deviation of image motion.

DESCRIPTION OF THE PREFERRED EMBODIMENT

Figure 1:
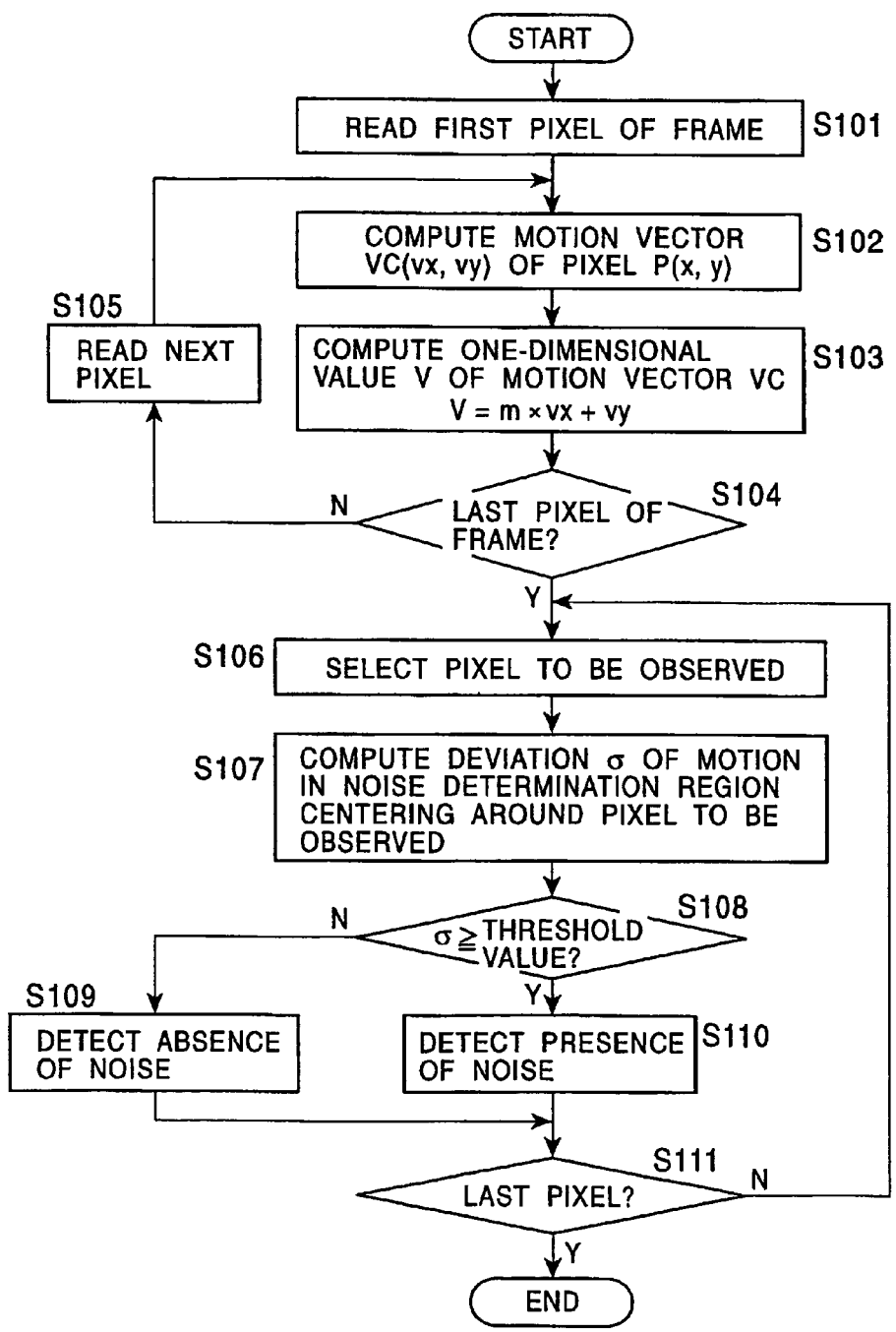
FIG. 1 is a flowchart illustrating a noise detecting method according to the embodiment of the present invention.
Figure 2:
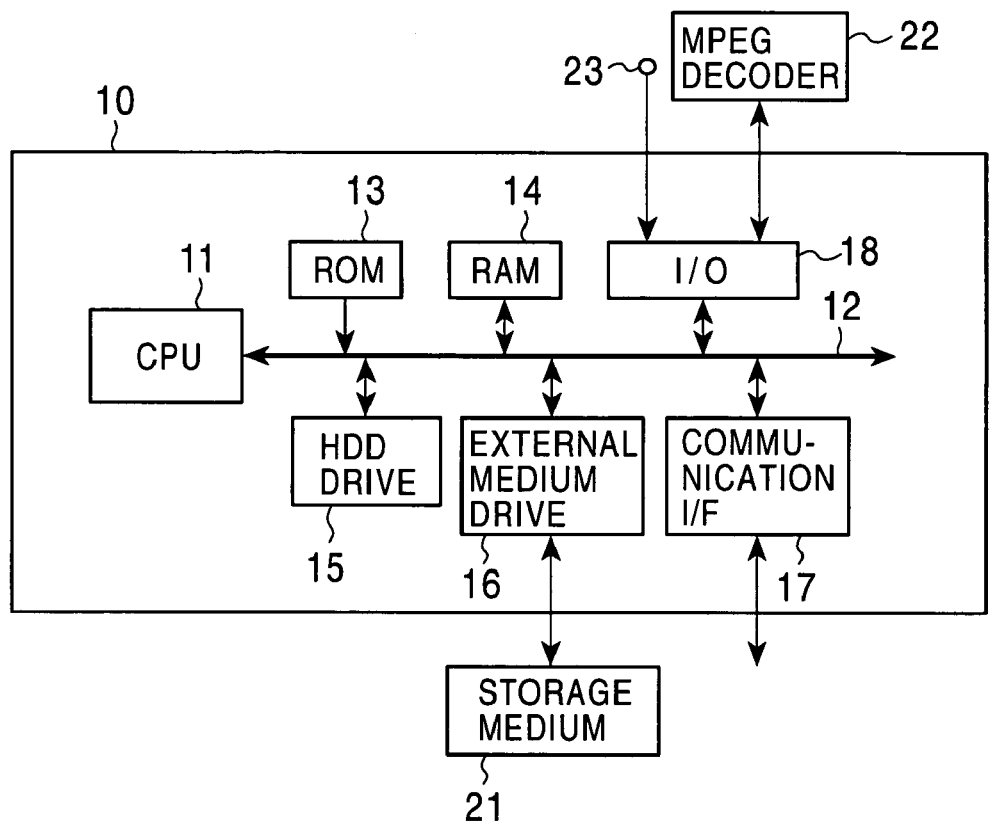
FIG. 2 is a block diagram illustrating the construction of a noise detecting apparatus according to the embodiment of the present invention.

FIG. 1 shows a flowchart illustrating a noise detecting method according to the embodiment of the present invention. FIG. 2 shows a block diagram of a noise detecting apparatus according to the embodiment of the present invention. The noise detecting apparatus shown in FIG. 2 uses the noise detecting method illustrated in FIG. 1.

In this embodiment, the noise detecting apparatus detects mosquito noise included in decoded data obtained by decompression-decoding MPEG compression-coded image data. In MPEG compression, image data is compressed by performing discrete cosine transformations on the image data and by restricting the high frequency components thereof. This produces the mosquito noise which is level variations in the luminance component and the chrominance component of the image data in the proximity of a high contrast edge or of a moving object.

As an example, the present invention is described using a case in which an image signal to undergo noise-detection is the image data obtained by decompression-decoding the MPEG compressed image data. In the present embodiment, noise detection is performed on luminance signal data. However, noise detection can be performed on chrominance signal data in the same manner though a description of it is omitted.

Hardware Construction of Noise Detecting Apparatus

The noise detecting apparatus includes a computer 10 in which a CPU (Central Processing Unit) 11 is connected via a system bus 12 to a program ROM (Read Only Memory) 13, a work area RAM (Random Access Memory) 14, an HDD (Hard Disk Drive) 15, an external medium drive 16, a communication interface 17, and an I/O (Input/Output) port 18.

The external medium drive serves to read an application program or data stored in an external storage medium 21, such as a disk storage medium (a CD-ROM (Compact Disk), DVD-ROM (Digital Versatile Disk), etc.) or a semiconductor memory. The communication interface 17 serves to exchange the application program or data via a communication network such as the Internet.

An MPEG decoder 22 decompression-decodes image data and outputs the decoded image data via the I/O port 18 to the system bus 12. The image data that is input to the I/O port 18 is compressed or uncompressed image data.

The storage medium 21 contains application software for performing noise detection. The application software is read via the system bus 12 from the storage medium 21 loaded in the external medium drive 16 to the RAM 14 or the HDD 15 to be executed.

Alternatively, the application software for performing noise detection may be prestored in the ROM 13 or the HDD 15 to be read and executed. Furthermore, the application software may be downloaded via the communication interface 17 from a server in the network such as the Internet to the RAM 14 or the HDD 15 to be read and executed.

Application Software for Performing Noise Detection

In the present embodiment, a motion vector is detected pixel-by-pixel. In addition, a noise determination area including a pixel to be observed and a plurality of pixels around it are set to detect the variation in the motion vectors VC of the pixels in the noise determination area. The variation in the motion vectors VC is computed as the deviation of the motion vector VC of the noise determination area. When a deviation value $\sigma$ is greater than a predetermined threshold value, the pixel to be observed is determined as a pixel having the noise.

Figure 3A:
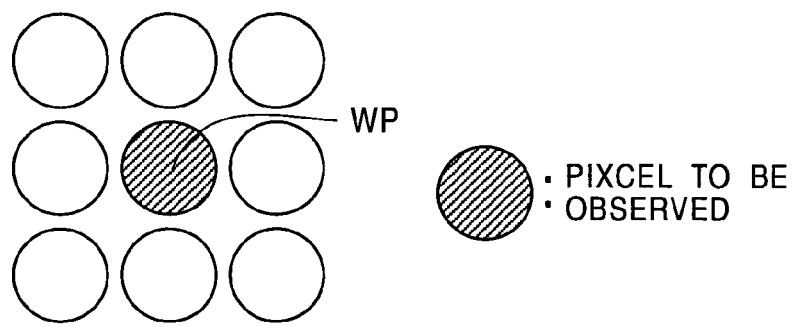
FIGS. 3A to 3c are illustrations of important parts of the noise detecting method.
Figure 3B:
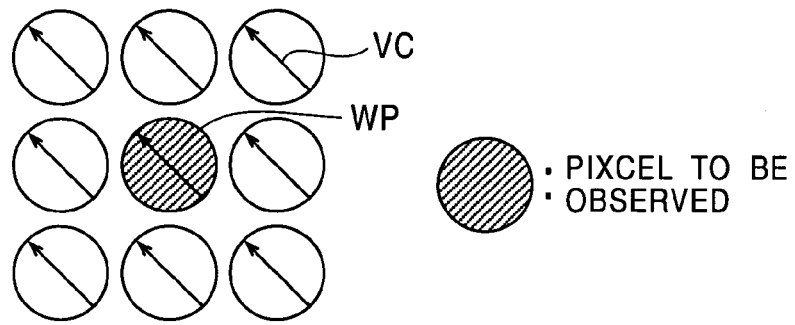
Figure 3C:
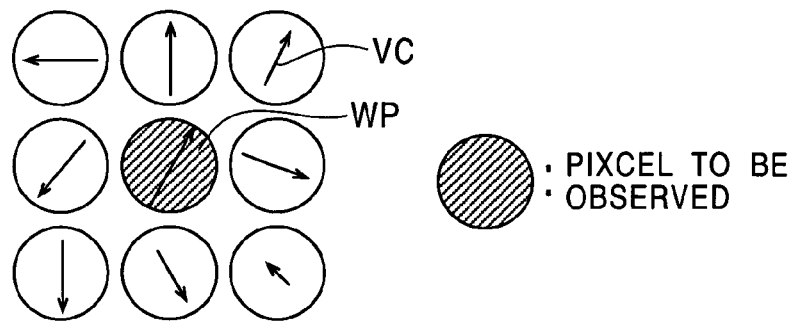

As shown in FIG. 3A, the noise determination area includes the pixel to be observed and its surrounding eight pixels, which constitute a three-pixel-by-three-pixel (nine pixels in all) region. The deviation value $\sigma$ of the motion vectors of the pixels in this noise determination area is computed. In such a small block area as the noise determination area, when no mosquito noise occurs, the motion vectors VCs of the nine pixels are substantially identical, as shown in FIG. 3B. On the other hand, when mosquito noise occurs, the motion vectors VC greatly vary in their directions as well as in their sizes, as shown in FIG. 3C. Hence, by detecting the deviation of the motion vectors VC of the pixels, it can be determined whether the pixel to be observed has the mosquito noise.

The motion vector VC has two values, which are the direction and the size. Normally, the motion vector VC represents a horizontal component $v_x$ of a screen and a vertical component $v_y$ thereof. When the deviation of the motion vectors are computed using the motion vectors VC, computation must be performed using the two components $v_x$ and $v_y$, which complicates the computation and lengthens the processing time.

In this embodiment, by transforming the motion vector VC into a one-dimensional value, the deviation of the motion vectors VC is computed using the one-dimensional transformed values V, so that the amount of computation is decreased.

Noise detecting processing is executed by the noise detecting apparatus shown in FIG. 2, which provides the above-described features. This noise detecting processing is described with reference to the flowchart shown in FIG. 1.

The steps are executed for each frame of image data that is input via the I/O port 18 from the MPEG decoder 22 or an input terminal 23 in accordance with the flowchart shown in FIG. 1. Initially, the first pixel data of a frame is read (step S101). The motion vector VC of the pixel data, which is obtained at step S101, is computed using the image data of the frame that is read just before the current frame (step S102). The motion vector VC of pixel data P can be represented as VC ($v_x$, $v_y$) where pixel data P (x, y) is the xth pixel in the horizontal direction of the screen and the yth pixel in the vertical direction of the screen, and the horizontal component of the motion vector of the pixel data P is $v_x$ and the vertical component thereof is $v_y$.

The computed motion vector VC ($v_x$, $v_y$) is transformed into the one-dimensional value V (step S103). There are various one-dimensional transforming methods. In the present embodiment, the following transformation expression (1) is employed.

$$V = m \times v_x + v_y \quad (1)$$

In the expression (1), $v_x$ and $v_y$ are in the ranges of $-m/2 < v_x < m/2$ and $-m/2 < v_y < m/2$, respectively, where, in the horizontal direction, toward the left indicated by a positive sign and toward the right indicated as a negative sign, and, in the vertical direction, upward indicated as the positive sign and downward indicated as the minus sign. when the absolute value of each of $v_x$ and $v_y$ is greater than m/2, the value is restricted to m/2. That is, m is set so that m/2>the maximum value of $|v_x|$ and m/2>the maximum value of $|v_y|$ are satisfied.

The reason why the values of $v_x$ and $v_x$ are restricted as described above is because ease of transformation is allowed for when the transformation expression (1) is employed.

The motion vector detection and the one-dimensional transformation are performed for every pixel of the frame (steps S104 and S105).

When one-dimensional transformation is performed on the motion vector of every pixel of the frame to obtain the one-dimensionally transformed value V of every motion vector, a pixel to be observed for determining whether it has the noise is sequentially assigned from the first pixel (step S106).

As described above, this pixel to be observed and its surrounding eight pixels are set as the noise determination area for detecting, using the one-dimensionally transformed value V, the deviation of the motion vectors of the pixels in the noise determination area (step S107). In the present embodiment, the variation in the motion vectors of the pixels in the noise determination area is computed as the deviation σ of the one-dimensionally transformed values V (step S107).

In this embodiment, the deviation σ is computed as follows. When the one-dimensionally transformed values V of the motion vectors of the nine pixels that are centered on the pixel to be observed are $V_0$, $V_1$, $V_2$, ..., and $V_8$, and $V_m$ is the average of the nine pixels, which is obtained using $$V_m = \sum_{i=0}^{8} (Vi/9),$$

the deviation σ is obtained by computing an approximate expression:

$$\sigma = \sum_{i=0}^{8} (Vm - Vi) \quad (2)$$

In this application, $$\sum_{i=0}^{8} A(i)$$

represents the total sum of A(0) to A(8), where A(i) is a variable with respect to i.

The deviation σ obtained in this manner is compared with a predetermined threshold value (step S108). When the deviation σ is smaller than the threshold value, the process determines that the pixel to be observed does not have mosquito noise (step S109). When the deviation a is larger than the threshold value, the process determines that the pixel to be observed has mosquito noise (step S110).

The above determination steps are executed for every pixel of the frame. When execution of the above determination steps for every pixel is completed, the processing for one frame shown in FIG. 1 is completed. The process shown in FIG. 1 resumes performing for the next frame.

For every pixel, the process determines whether the pixel has the mosquito noise. The result of the determination is shown in FIGS. 4A to 7B.

Figure 4A:
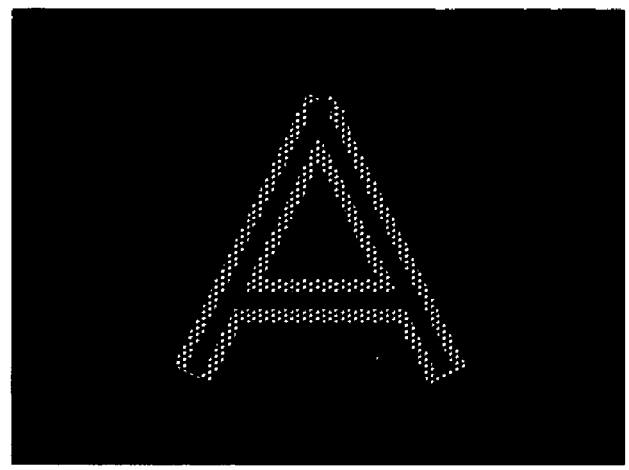
FIGS. 4A and 4B are illustrations of processing results obtained using the noise detecting method.
Figure 4B:
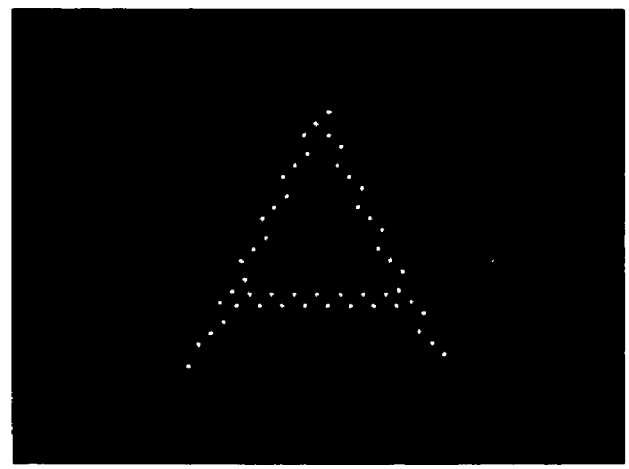

In FIGS. 4A and 4B, with respect to a substantially-still-image-like image in which character "A" is displayed in the same position of the screen, the motion vector of each pixel is computed and the computed motion vector is transformed into the one-dimensional value V, so that the image obtained by replacing each pixel with its one-dimensionally transformed value V is displayed.

FIG. 4A shows the one-dimensionally transformed image data having the mosquito noise in which the image data was MPEG compressed for transmission. Since the image data excluding the periphery of the character is in a still-image area, the motion vectors of the pixels in the area are the same, causing the pixels to have an intermediate luminance (gray). However, since the motion vectors of the periphery of the character are random due to the influence of the mosquito noise, the pixels do not have the intermediate luminance, whereby what is displayed, for example, in FIG. 4A is shown.

FIG. 4B shows the one-dimensionally transformed image data having no mosquito noise in which the image data was transmitted without being compressed. Since no mosquito noise occurs, with respect to the entire area including the character and its background, there is no part where the motion vector is random. Accordingly, since the process determines that the image data substantially entirely consists of the still image part (no motion), the image having the intermediate luminance (gray) is displayed.

Figure 5A:
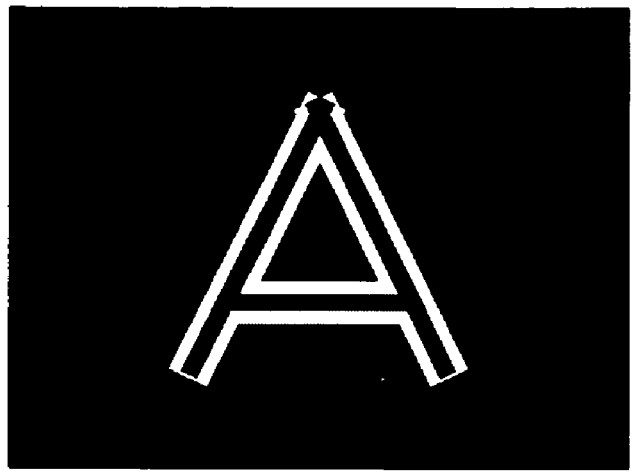
FIGS. 5A and 5B are illustrations of processing results obtained using the noise detecting method.

Therefore, when the image data shown in FIG. 4A is displayed so that, based on determination result using the deviation σ, the pixels determined to have the noise are displayed in white and the pixels determined to have no noise are displayed in black, the image shown in FIG. 5A is obtained. This shows that the part where the mosquito noise occurs can be precisely detected.

Figure 5B:
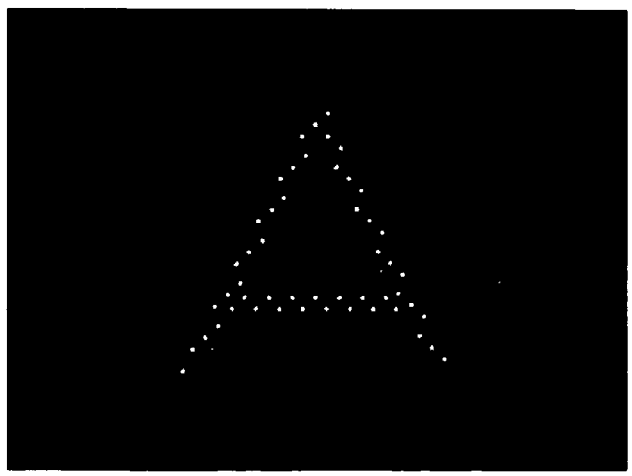

When the image data shown in FIG. 4B is displayed in the above described manner, the image shown in FIG. 5B is obtained. This shows that there is substantially no occurrence of the mosquito noise.

Figure 6A:
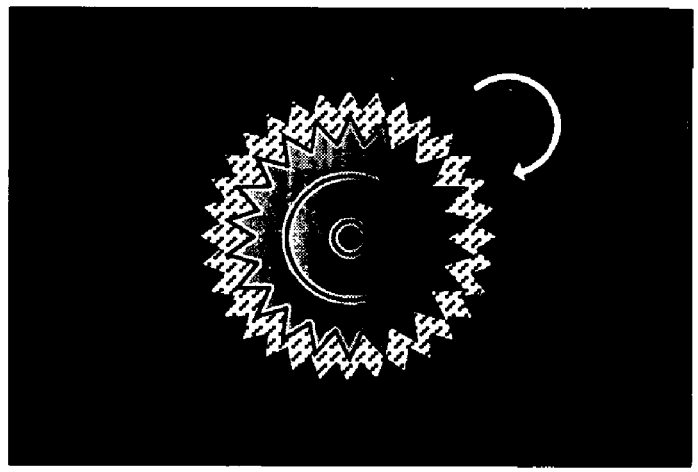
FIGS. 6A and 6B are illustrations of processing results obtained using the noise detecting method.

FIG. 6A shows the image obtained by replacing each pixel of a moving picture of a rotating gear with the one-dimensionally transformed value V of the motion vector of each pixel. In the image shown in FIG. 6A, the pixels are displayed as follows: pixels that move upward are displayed in white whose gradations are in accordance with the sizes of the moving directions thereof; pixels that move downward are displayed in black whose gradations are in accordance with the sizes of the moving directions thereof; and pixels that do not move are displayed in the intermediate luminance (gray). Therefore, since the gear rotates, the luminance of this gear is laterally reversed. Since there is no motion in the background of the gear, the background is shown in the intermediate luminance (gray). The motion vectors are random in the periphery of the gear due to the influence of the mosquito noise, whereby the black-and-white pattern is displayed as shown in FIG. 6A.

Figure 6B:
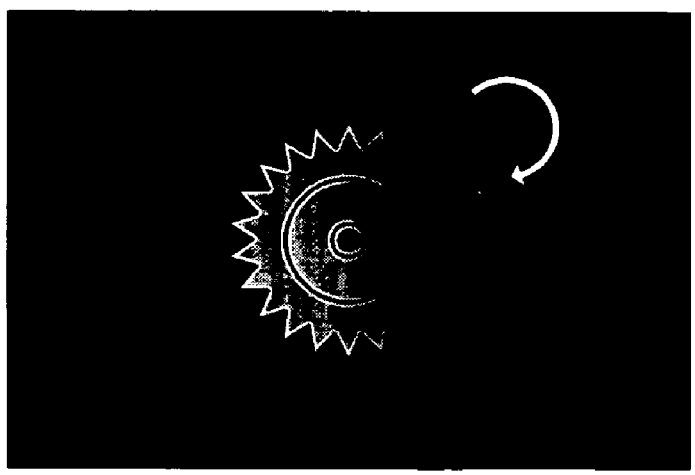

FIG. 6B shows the one-dimensionally transformed moving picture of the rotating gear having no mosquito noise in which the moving picture undergoes no compression and the like to be transmitted. In FIG. 6B, there is no pattern which indicates the occurrence of the random motion vectors due to the influence of the mosquito noise in the periphery of the rotating gear.

Figure 7A:
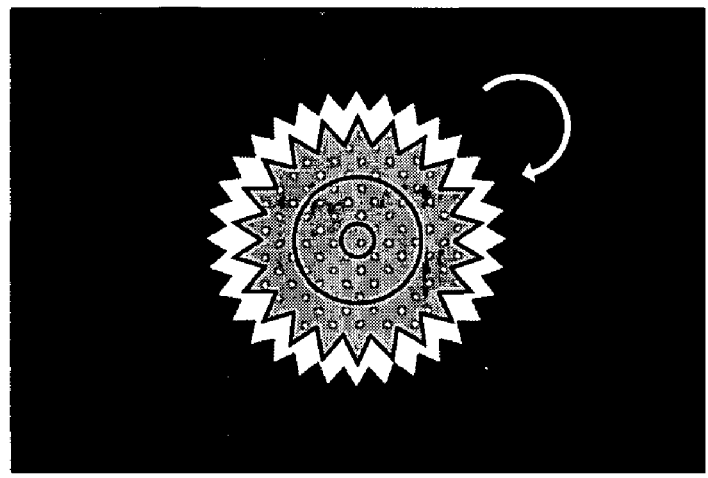
FIGS. 7A and 7B are illustrations of processing results obtained using the noise detecting method.

Therefore, when the image data shown in FIG. 6A is displayed so that, based on determination result using the deviation σ, the pixels determined to have the noise are displayed in white and the pixels determined to have no noise are displayed in black, the image shown in FIG. 7A is obtained. This shows that the part where the mosquito noise occurs can be precisely detected.

Figure 7B:
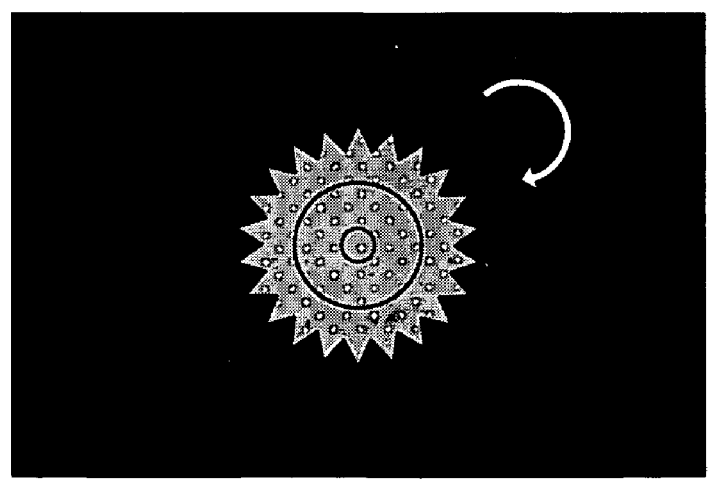

When the image data shown in FIG. 6B is displayed in the above described manner, the image shown in FIG. 7B is obtained. This shows that there is substantially no occurrence of the mosquito noise.

Figure 8:
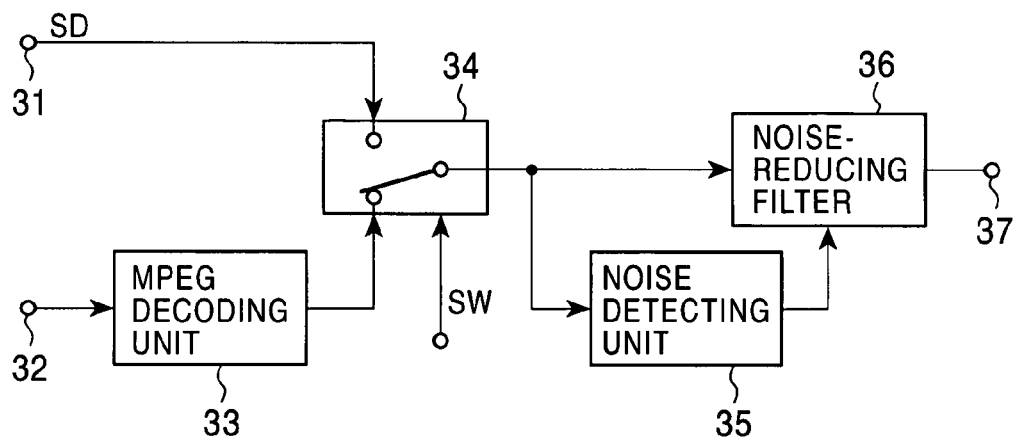
FIG. 8 is a block diagram showing the construction of an image-data processing apparatus according to the embodiment of the present invention.
Figure 9A:
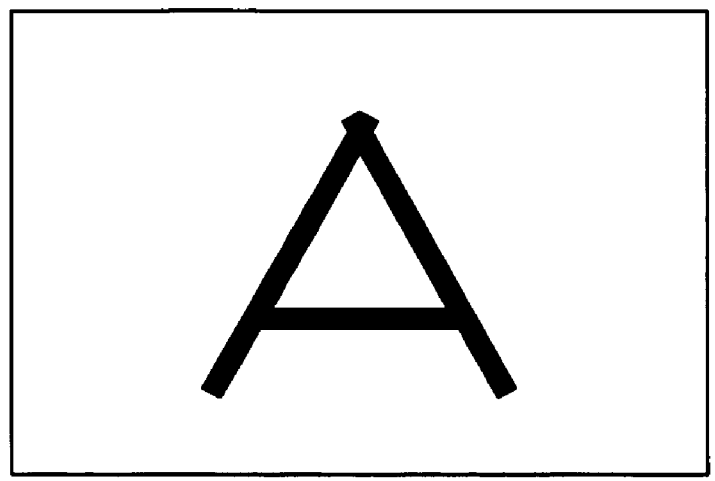
FIGS. 9A and 9B are illustrations of a part where noise occurs in a conventional image-data processing apparatus.
Figure 9B:
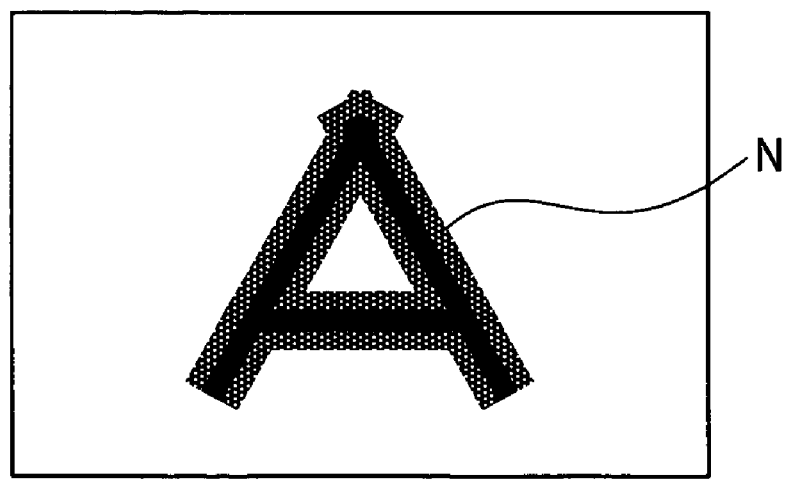
Figure 10A:
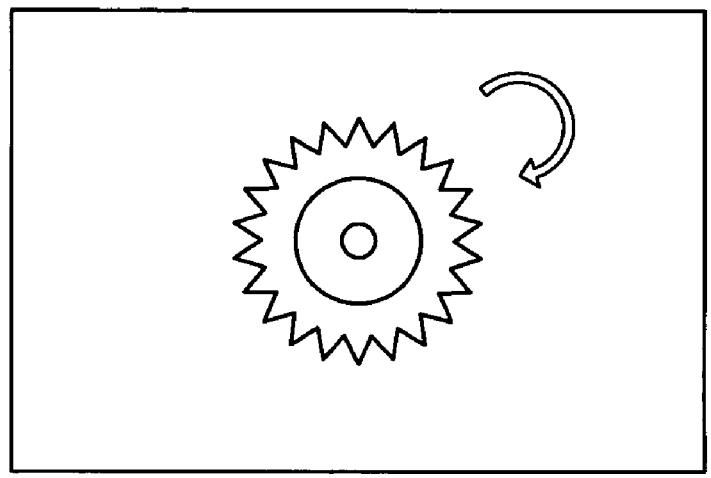
FIGS. 10A and 10B are illustrations of a part where the noise occurs in the conventional image-data processing apparatus.
Figure 10B:
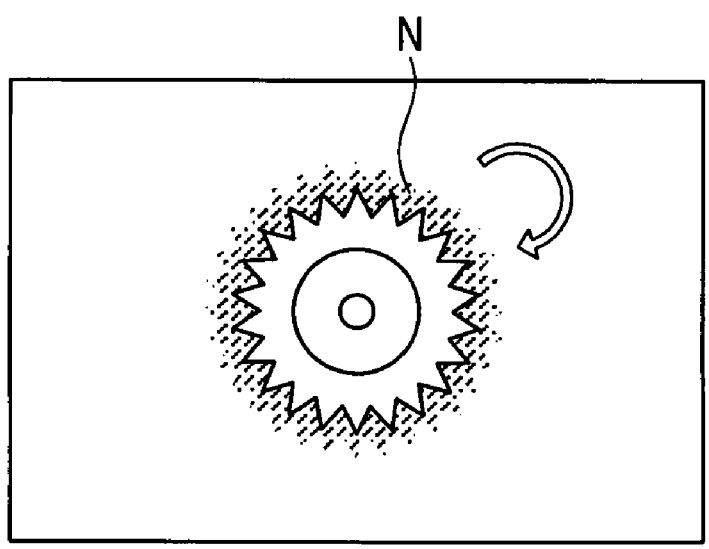
Figure 11:
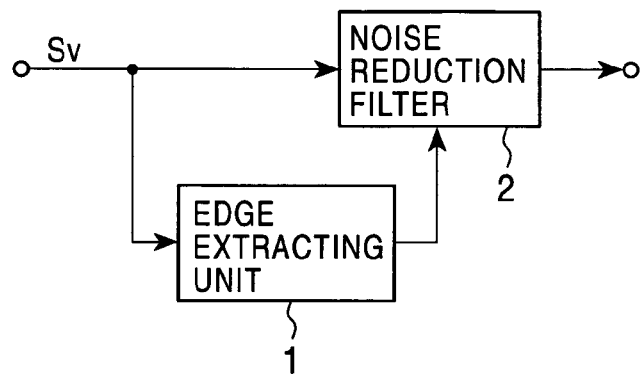
FIG. 11 is a block diagram showing the construction of one example of the conventional image-data processing apparatus.
Figure 12:
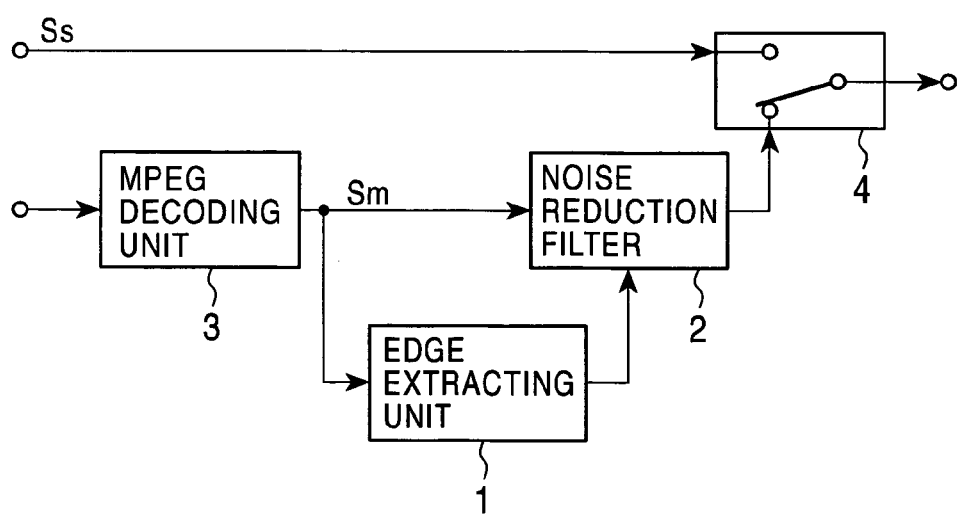
FIG. 12 is a block diagram showing the construction of another example of the conventional image-data processing apparatus.

As described above, since the noise detecting apparatus according to the present embodiment can precisely detect the part where the mosquito noise occurs, an image data processing apparatus which reduces the mosquito noise can be constructed having an arrangement as shown in FIG. 8.

An MPEG decoding unit 33 receives MPEG compression-coded image data via an input terminal 32 and decompression-decodes the compression-coded image data. A switching circuit 34 receives the decompression-decoded image data at one input terminal thereof and receives image data SD at the other input terminal, in which the image data SD has the same format as that of the output of the MPEG decoding unit 33 and undergoes no compression encoding.

This switching circuit 34 is switched in accordance with a switching signal SW in response to an input operation by a user. Alternatively, the switching circuit 34 may be switched in accordance with the type of the input image data. The output of the switching circuit 34 is supplied to a noise detecting unit 35 as well as a noise reducing filter 36.

The noise detecting unit 35 employs the noise detecting apparatus shown in FIG. 2. Detecting a pixel part having the mosquito noise occurs, the noise detecting unit 35 outputs, to the noise-reducing filter 36, a signal indicating only the detected noise pixel part as a noise detection output.

The noise-reducing filter 36 performs noise-reducing filtering processing on only the data of the part having the mosquito noise that is indicated by the output of the noise-detecting unit 35. Accordingly, an output terminal 37 receives the image data having the mosquito noise reduced or removed.

The image data processing apparatus having the construction shown in FIG. 8 causes the noise detecting unit 35 to precisely detect a part having the mosquito noise and then causes the noise reducing filter 36 to perform filtering processing on only the part having the mosquito noise based on the detection result. Therefore, when the image data having no mosquito noise is input from the input terminal 31, the noise-reducing filter 36 does not perform filtering processing, which does not degrade the quality of the image data.

When the image data obtained by decompression-decoding the MPEG compression-coded image data is input to the input terminal 31, the noise-detecting unit 35 precisely detects a part having the mosquito noise and the noise-reducing filter 36 performs filtering processing on the part having the mosquito noise based on the detection result, which enables reduction in the noise to be achieved.

In the above embodiment, for every pixel to be observed, it is determined based on the deviation of the motion vectors of the pixels in the noise determination area whether the pixel has the noise. Alternatively, for units of a plurality of pixels, instead of for every pixel to be observed, it is determined whether the unit has the noise.

In the above embodiment, the motion vectors are detected pixel-by-pixel. Alternatively, the motion vectors may be detected in units of blocks, each of which includes a plurality of pixels, so that noise detection is performed in units of blocks in the same manner as described above. In this case, the noise determination area includes a block to be observed and a plurality of blocks around it, whereby it is determined, based on the deviation of the motion vectors of the blocks in the noise determination area, whether the block has the noise. In this case, it may be determined whether not only the block to be observed but also the noise determination area has the noise.

When the image data is input along with the motion vectors attached, these attached motion vectors may be used for detecting the noise, instead of computing the motion vectors from the decoded image data.

In the above embodiment, the motion vector is converted into the one-dimensional value using the expression (1) and then the variation in the motion is computed using the obtained one-dimensional value. However, the variation may be computed using the motion vector.

In order to simplify computation of the variation in the motion of a pixel or the motion of a plurality of pixels, only the size component of the motion vector may be used instead of using the one-dimensional value. Alternatively, only the direction component of the motion vector may be used.

The highly efficiently data coding method for performing the frequency transformation and lossy compression coding is not restricted to the MPEG method. In addition, the generated noise is not restricted to the mosquito noise.

What is claimed is:

1. An image processing apparatus for detecting a noise exhibiting area in image data generated by decoding encoded data encoded by a frequency transform method and a lossy compression method, the image processing apparatus comprising:
    motion detection means for detecting a motion vector for each pixel of said image data;
    area-motion detection means for detecting at least one motion in an area having more than one pixel in said image data, based on the motion vector for each pixel detected by said motion detection means;

deviation detection means for detecting the deviation of the at least one motion in the area having at least one pixel; and noise detection means for detecting the noise exhibiting area based on a predetermined threshold and the detected deviation; and wherein said motion vector is computed by the expression: $V=m \times v_x + v_y$, where $v_x$ is a horizontal component of said motion vector, $v_y$ is a vertical component of said motion vector, m is an integer value, and $v_x$ and $v_y$ are in a range between $-m/2$ and $m/2$.

2. An image processing apparatus according to claim 1, wherein said deviation detection means detects the deviation of the image motion in accordance with the deviation of the norm of the image motion.

3. An image processing apparatus according to claim 1, wherein said deviation detection means detects said deviation of image motion in accordance with the deviation of the direction of the image motion.

4. An image processing apparatus according to claim 1, wherein:
   said motion detection means detects a motion vector as the motion; and
   said deviation detection means detects the deviation of the image motion in accordance with the deviation of said motion vectors.

5. An image processing apparatus according to claim 1, wherein:
   said motion detection means detects a motion vector as the motion, converts the motion vector to a one-dimensional value as the motion, and outputs said one-dimensional value; and
   said deviation detection means detects said deviation of the image motion in accordance with the deviation of said one-dimensional value.

6. An image processing apparatus according to claim 5, wherein said noise detection means detects said noise exhibiting area by comparing the deviation value of said one-dimensional value with said predetermined threshold value.

7. An image processing apparatus according to claim 1, further comprising:
   decoding means for decoding the encoded image data encoded by the frequency transform method and the lossy compression method;
   noise reduction means for reducing the amount of noise of said noise exhibiting area detected by said noise detection means; and
   selective outputting means for selectively outputting one of said decoded image data from said decoding means and said image data to said noise detection means and said noise reduction means according to a control signal.

8. An image processing apparatus according to claim 7, wherein said deviation detection means detects said deviation of the image motion in accordance with the deviation of the norm of the image motion.

9. An image processing apparatus according to claim 7, wherein said deviation detection means detects said deviation of the image motion in accordance with the deviation of the direction of the image motion.

10. An image processing apparatus according to claim 7, wherein:
    said motion detection means detects a motion vector as the motion; and
    said deviation detection means detects said deviation of the image motion in accordance with the deviation of said motion vectors.

11. An image processing apparatus according to claim 7, wherein:
    said motion detection means detects a motion vector as the motion, converts the motion vector into a one-dimensional value as the motion, and outputs said one-dimensional value; and
    said deviation detection means detects said deviation of the image motion in accordance with the deviation of said one-dimensional value.

12. An image processing apparatus according to claim 11, wherein said noise detection means detects said noise exhibiting area by comparing the deviation value of said one-dimensional value with said predetermined threshold value.

13. An image processing method for detecting a noise exhibiting area in image data generated by decoding encoded data encoded by a frequency transform method and a lossy compression method, the image processing method comprising the steps of:
    detecting a motion vector for each pixel of said image data;
    detecting at least one motion in an area having more than one pixel in the image data, based on the detected motion vector for each pixel;
    detecting deviation of the at least one motion in the area having at least one pixel; and
    detecting the noise exhibiting area based on a predetermined threshold and the detected deviation; and
    wherein said motion vector is computed by the expression: $V=m \times v_x + v_y$, where $v_x$ is a horizontal component of said motion vector, $v_y$ is a vertical component of said motion vector, m is an integer value, and $v_x$ and $v_y$ are in a range between $-m/2$ and $m/2$.

14. A storage medium for storing a computer-controllable program for detecting a noise exhibiting area in image data generated by decoding encoded data encoded by a frequency transform method and a lossy compression method, said computer program comprising the steps of:
    detecting a motion vector for each pixel of said image data;
    detecting at least one motion on an area having more than one pixel in said image data, based on the detected motion vector for each pixel;
    detecting the deviation of the at least one motion on the area having at least one pixel; and
    detecting the noise exhibiting area based on a predetermined threshold and the detected deviation; and
    wherein said motion vector is computed by the expression: $V=m \times v_x + v_y$, where $v_x$ is a horizontal component of said motion vector, $v_y$ is a vertical component of said motion vector, m is an integer value, and $v_x$ and $v_y$ are in a range between $-m/2$ and $m/2$.

15. An image processing apparatus according to claim 1, wherein said area is a block having a plurality of pixels.

16. An image processing apparatus according to claim 1, wherein said area is a unit of blocks, each of which has a plurality of pixels.

17. An image processing apparatus according to claim 1, wherein said noise exhibiting area is a pixel in the area.

18. An image processing apparatus according to claim 1, wherein said noise exhibiting area is a block having a plurality of pixels in the area.

19. An image processing apparatus according to claim 1, wherein said noise exhibiting area is a unit of blocks, each of which has a plurality of pixels in the area.

20. An image processing apparatus according to claim 1, wherein said motion detection means detects at least one motion of a pixel and a number of pixels around the respective pixel in an area in said image data, and said deviation detection means detects the deviation of the at least one motion of the respective pixel and the number of pixels in the area.

21. An image processing apparatus according to claim 1, wherein said noise detection means detects that the respective pixel is exhibiting noise when the detected deviation is greater than and equal to said predetermined threshold value and for detecting that the respective pixel is not exhibiting noise when the detected deviation is below said predetermined threshold value.

22. An image processing method according to claim 13, wherein said area is a block having a plurality of pixels.

23. An image processing method according to claim 13, wherein said area is a unit of blocks, each of which has a plurality of pixels.

24. An image processing method according to claim 13, wherein said noise exhibiting area is a pixel in the area.

25. An image processing method according to claim 13, wherein said noise exhibiting area is a block having a plurality of pixels in the area.

26. An image processing method according to claim 13, wherein said noise exhibiting area is a unit of blocks, each of which has a plurality of pixels in the area.

27. An image processing method according to claim 13, wherein the motion detecting step detects at least one motion of a pixel and a number of pixels around the respective pixel in an area in said image data, and the deviation detecting step detects the deviation of the at least one motion of the respective pixel and the number of pixels in the area.

28. An image processing method according to claim 13, wherein the noise exhibiting area detecting step detects that the respective pixel is exhibiting noise when the detected deviation is greater than or equal to said predetermined threshold value and detects that the respective pixel is not exhibiting noise when the detected deviation is below said predetermined threshold value.

29. A storage medium according to claim 14, wherein the motion detecting step detects at least one motion of a pixel and a number of pixels around the respective pixel in an area in said image data, and the deviation detecting step detects the deviation of the at least one motion of the respective pixel and the number of pixels in the area.

30. A storage medium according to claim 14, wherein the noise exhibiting area detecting step detects that the respective pixel is exhibiting noise when the detected deviation is greater than or equal to said predetermined threshold value and detects that the respective pixel is not exhibiting noise when the detected deviation is below said predetermined threshold value.

* * * * *